(12) United States Patent
Weng

(10) Patent No.: US 11,870,306 B2
(45) Date of Patent: Jan. 9, 2024

(54) WAVE ENERGY CONVERSION DEVICE AND DUAL-AXIAL WAVE ENERGY CONVERSION DEVICE

(71) Applicant: FLH Energy Technology Ltd., New Taipei (TW)

(72) Inventor: Ching-Liang Weng, New Taipei (TW)

(73) Assignee: FLH Energy Technology Ltd., New Taipei (TW)

( * ) Notice: Subject to any disclaimer, the term of this patent is extended or adjusted under 35 U.S.C. 154(b) by 98 days.

(21) Appl. No.: 17/372,556

(22) Filed: Jul. 12, 2021

(65) Prior Publication Data
US 2022/0220931 A1 Jul. 14, 2022

(30) Foreign Application Priority Data

Jan. 13, 2021 (TW) ................................. 110101224

(51) Int. Cl.
*H02K 1/00* (2006.01)
*H02K 1/276* (2022.01)

(52) U.S. Cl.
CPC ...... *H02K 1/276* (2013.01); *F05B 2220/7068* (2013.01)

(58) Field of Classification Search
CPC .. F03B 13/20; F03B 13/14; F05B 2220/7068; F05B 2220/7066; F05B 2250/02; F05B 2250/411; F05B 2270/202; F05B 2220/706; H02K 1/276; H02K 5/10; H02K 5/12;

(Continued)

(56) References Cited

U.S. PATENT DOCUMENTS

| 4,092,828 A | 6/1978 | Garza |
| 4,260,901 A * | 4/1981 | Woodbridge ....... F03B 13/1855 417/331 |
| 5,789,826 A | 8/1998 | Kumbatovic |

(Continued)

FOREIGN PATENT DOCUMENTS

| CN | 101000031 A | 7/2007 |
| CN | 104564499 A | 4/2015 |

(Continued)

OTHER PUBLICATIONS

Han, the specification, including the claims, and drawings in the U.S. Appl. No. 17/369,981, filed Jul. 8, 2021.

(Continued)

*Primary Examiner* — Julio C. Gonzalez
(74) *Attorney, Agent, or Firm* — Winston Hsu

(57) ABSTRACT

A wave energy conversion device includes a permanent magnet generator, a first driving component and a second driving component. The permanent magnet generator includes a stator structure and a rotor structure. The stator structure includes a stator body. The rotor structure includes a rotor body. The rotor body is disposed inside the stator body in a swinging manner or in a rotatable manner. The first driving component is coupled to the rotor structure. The second driving component is coupled to the stator structure. The wave energy conversion device of the present invention requires a low speed/angle of a swinging/rotating movement of the rotor body relative to the stator body to generate electricity, which facilitates electricity generation from wave energy.

13 Claims, 16 Drawing Sheets

(58) Field of Classification Search
CPC .. H02K 7/1876; H02K 7/1892; H02K 7/1807; H02K 1/165; H02K 1/2706; Y02E 10/30
See application file for complete search history.

(56) References Cited

U.S. PATENT DOCUMENTS

| | | | |
|---|---|---|---|
| 7,443,047 B2 | 10/2008 | Ottersen | |
| 8,358,025 B2 * | 1/2013 | Hogmoe | F03B 13/20 290/53 |
| 2004/0155537 A1 | 8/2004 | Nakano | |
| 2008/0036215 A1 | 2/2008 | Gizaw | |
| 2008/0211338 A1 | 9/2008 | Koka | |
| 2010/0127500 A1 | 5/2010 | Yang | |
| 2011/0042954 A1 * | 2/2011 | Werjefelt | F03B 13/20 290/53 |
| 2012/0093644 A1 | 4/2012 | Croughs | |
| 2012/0187696 A1 | 7/2012 | Miyamoto | |
| 2013/0008158 A1 | 1/2013 | Hon | |
| 2014/0248151 A1 | 9/2014 | Dong | |
| 2018/0010571 A1 | 1/2018 | Werjefelt | |
| 2019/0006900 A1 * | 1/2019 | Nakayama | H02K 3/38 |
| 2019/0252933 A1 | 8/2019 | Yatsurugi | |
| 2022/0224211 A1 | 7/2022 | Weng | |
| 2022/0224212 A1 | 7/2022 | Han | |

FOREIGN PATENT DOCUMENTS

| | | |
|---|---|---|
| CN | 104564500 A | 4/2015 |
| CN | 204669112 U | 9/2015 |
| CN | 205070625 U | 3/2016 |
| CN | 103994015 B | 8/2016 |
| CN | 103821662 B | 11/2017 |
| CN | 108105019 A | 6/2018 |
| CN | 108518300 A | 9/2018 |
| CN | 107370335 B | 3/2019 |
| CN | 106655622 B | 4/2019 |
| CN | 109653939 A | 4/2019 |
| CN | 208884467 U | 5/2019 |
| CN | 109185024 B | 5/2020 |
| CN | 111472920 A | 7/2020 |
| CN | 111963363 A | 11/2020 |
| DE | 196 12 124 A1 | 10/1997 |
| DE | 10 2017 105 914 A1 | 9/2018 |
| EP | 1 458 080 A1 | 9/2004 |
| GB | 2551563 A | 12/2017 |
| TW | M408189 U1 | 7/2011 |
| TW | M431224 U1 | 6/2012 |
| TW | 201230617 A1 | 7/2012 |
| TW | 201636503 A | 10/2016 |
| TW | 201902345 A | 1/2019 |
| WO | 2008/004893 A1 | 1/2008 |

OTHER PUBLICATIONS

Weng, the specification, including the claims, and drawings in the U.S. Appl. No. 17/496,775, filed Oct. 8, 2021.

* cited by examiner

WAVE ENERGY CONVERSION DEVICE AND DUAL-AXIAL WAVE ENERGY CONVERSION DEVICE

BACKGROUND OF THE INVENTION

1. Field of the Invention

The present invention relates to an energy conversion device, and more specifically, to a wave energy conversion device and dual-axial wave energy conversion device.

2. Description of the Prior Art

Wave energy conversion technology is used for converting wave energy into electricity. The wave energy is unstable and irregular but is inexhaustible in supply and always available for use. Therefore, wave energy conversion has a greater potential than any other ocean energy conversion, and it becomes an important topic in the field to reduce maintenance cost, improve reliability, and stabilize an amount of electricity generation of the wave energy conversion.

SUMMARY OF THE INVENTION

Therefore, it is an objective of the present invention to provide a wave energy conversion device and dual-axial wave energy conversion device for solving the aforementioned problem.

In order to achieve the aforementioned objective, the present invention discloses a wave energy conversion device including a permanent magnet generator, a first driving component and a second driving component. The permanent magnet generator includes a stator structure and a rotor structure. The stator structure includes a stator body. The rotor structure includes a rotor body. The rotor body is disposed inside the stator body in a swinging manner or a rotating manner. The first driving component is coupled to the rotor structure. The second driving component is coupled to the stator structure.

According to an embodiment of the present invention, a plurality of stator slots are formed on the stator body. A plurality of rotor slots are formed on the rotor body. A central axis of the stator body is coincided with a central axis of the rotor body. The plurality of stator slots are arranged along a circumferential direction of the stator body, and the plurality of rotor slots are arranged along a circumferential direction of the rotor body.

According to an embodiment of the present invention, the rotor structure further includes a plurality of permanent magnets respectively disposed inside the plurality of rotor slots. A number of the plurality of permanent magnets is identical to a number of the plurality of rotor slots, and the stator structure further includes a plurality of stator coils wrapped around the plurality of stator slots.

According to an embodiment of the present invention, the stator structure further includes a shell, and the stator body is fixedly disposed inside the shell.

According to an embodiment of the present invention, the rotor structure further includes a connecting shaft coupled to the rotor body. The connecting shaft passes through the shell and is coupled to the first driving component, and the shell is coupled to the second driving component.

According to an embodiment of the present invention, each of the stator body and the rotor body is formed by a plurality of silicon steel sheets.

According to an embodiment of the present invention, each of the first driving component and the second driving component is a floating component.

According to an embodiment of the present invention, the floating component includes a first portion and a second portion, and the second portion is movable relative to the first portion to increase or reduce a total length of the floating component.

In order to achieve the aforementioned objective, the present invention further discloses a dual-axial wave energy conversion device including a first permanent magnet generator, a second permanent magnet generator, a first driving component and a second driving component. The first permanent magnet generator includes a first stator structure and a first rotor structure. The first stator structure includes a first stator body. The first rotor structure includes a first rotor body. The first rotor body is disposed inside the first stator body in a swinging manner or in a rotating manner. The second permanent magnet generator includes a second stator structure and a second rotor structure. The second stator structure includes a second stator body. The second rotor structure includes a second rotor body. The second rotor body is disposed inside the second stator body in a swinging manner or in a rotating manner. A swinging direction or a rotating direction of the second rotor body is different from a swinging direction or a rotating direction of the first rotor body. The first driving component is coupled to the first permanent magnet generator. The second driving component is coupled to the second permanent magnet generator.

According to an embodiment of the present invention, a plurality of first stator slots are formed on the first stator body. A plurality of first rotor slots are formed on the first rotor body. A central axis of the first stator body is coincided with a central axis of the first rotor body. The plurality of first stator slots are arranged along a circumferential direction of the first stator body. The plurality of first rotor slots are arranged along a circumferential direction of the first rotor body. A plurality of second stator slots are formed on the second stator body. A plurality of second rotor slots are formed on the second rotor body. A central axis of the second stator body is coincided with a central axis of the second rotor body. The plurality of second stator slots are arranged along a circumferential direction of the second stator body, and the plurality of second rotor slots are arranged along a circumferential direction of the second rotor body.

According to an embodiment of the present invention, the first rotor structure further includes a plurality of first permanent magnets respectively disposed inside the plurality of first rotor slots. A number of the plurality of first permanent magnets is identical to a number of the plurality of first rotor slots. The first stator structure further includes a plurality of first stator coils wrapped around the plurality of first stator slots. The second rotor structure further includes a plurality of second permanent magnets respectively disposed inside the plurality of second rotor slots. A number of the plurality of second permanent magnets is identical to a number of the plurality of second rotor slots, and the second stator structure further includes a plurality of second stator coils wrapped around the plurality of second stator slots.

According to an embodiment of the present invention, the first stator structure further includes a first shell. The first stator body is fixedly disposed inside the first shell. The second stator structure further includes a second shell, and the second stator body is fixedly disposed inside the second shell.

According to an embodiment of the present invention, the first rotor structure further includes a first connecting shaft coupled to the first rotor body. The first connecting shaft passes through the first shell. The second rotor structure further includes a second connecting shaft coupled to the second rotor body, and the second connecting shaft passes through the second shell.

According to an embodiment of the present invention, each of the first stator body, the first rotor body, the second stator body and the second rotor body is formed by a plurality of silicon steel sheets.

According to an embodiment of the present invention, each of the first driving component and the second driving component is a floating component.

According to an embodiment of the present invention, the floating component includes a first portion and a second portion, and the second portion is movable relative to the first portion to increase or reduce a total length of the floating component.

According to an embodiment of the present invention, the dual-axial wave energy conversion device further includes at least one extending and retracting assembly configured to move at least one of the first driving component and the second driving component for increasing or reducing a distance between the first driving component and the second driving component.

In summary, the wave energy conversion device of the present invention utilizes a coupling connection of the first driving component and the rotor structure and a coupling connection of the second driving component and the stator structure to convert a wave movement into a rotating movement or a swinging movement of the rotor body relative to the stator body by the first driving component and the second driving component. Furthermore, a ratio of the number of the plurality of rotor slots to a number of the plurality of stator slots can be 8:9, and the number of the plurality of the rotor slots and the number of the plurality of the stator slots can be at least equal to 64 and 72, respectively. Due to the aforementioned configuration, the wave energy conversion device only requires a low speed and a small angle of the rotating movement or the swinging movement of the rotor body relative to the stator body, for generating electricity. Therefore, even if amplitude of the wave movement is small, the wave energy conversion device can generate electricity stably, which improves reliability and stability of electricity generation. Besides, the wave energy conversion device has simple structure, which reduces maintenance cost. In addition, the dual-axial wave energy conversion of the present invention utilizes a coupling connection of the first driving component and the first permanent magnet generator, a coupling connection of the second driving component and the second permanent magnet generator and a coupling connection of the first permanent magnet generator and the second permanent magnet generator to convert wave movements along different directions into a rotating movement or a swinging movement of the first rotor body relative to the first stator body and a rotating movement or a swinging movement of the second rotor body relative to the second stator body by the first driving component and the second driving component. Moreover, the structure of each of the first permanent magnet generator and the second permanent magnet generator of the dual-axial wave energy conversion device is similar to the one of the permanent magnet generator of the wave energy conversion device. Due to the aforementioned configuration, the dual-axial wave energy conversion device only requires a low speed and a small angle of the rotating movement or the swinging movement of the first rotor body relative to the first stator body and a low speed and a small angle of the rotating movement or the swinging movement of the second rotor body relative to the second stator body but does not require a fixed wave direction, for generating electricity. Therefore, even if amplitude of the wave movement is small and the wave direction is changed by wind, the dual-axial wave energy conversion device still can generate electricity stably, which improves reliability and stability of electricity generation. Besides, the dual-axial wave energy conversion device has simple structure, which reduces maintenance cost.

These and other objectives of the present invention will no doubt become obvious to those of ordinary skill in the art after reading the following detailed description of the preferred embodiment that is illustrated in the various figures and drawings.

DETAILED DESCRIPTION

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the Figure(s) being described. The components of the present invention can be positioned in a number of different orientations. As such, the directional terminology is used for purposes of illustration and is in no way limiting. Accordingly, the drawings and descriptions will be regarded as illustrative in nature and not as restrictive. Also, the term "connect" or "couple" is intended to mean either an indirect or direct electrical/mechanical connection. Thus, if a first device is connected to or coupled to a second device, that connection may be through a direct electrical/mechanical connection, or through an indirect electrical/mechanical connection via other devices and connections.

Figure 1:
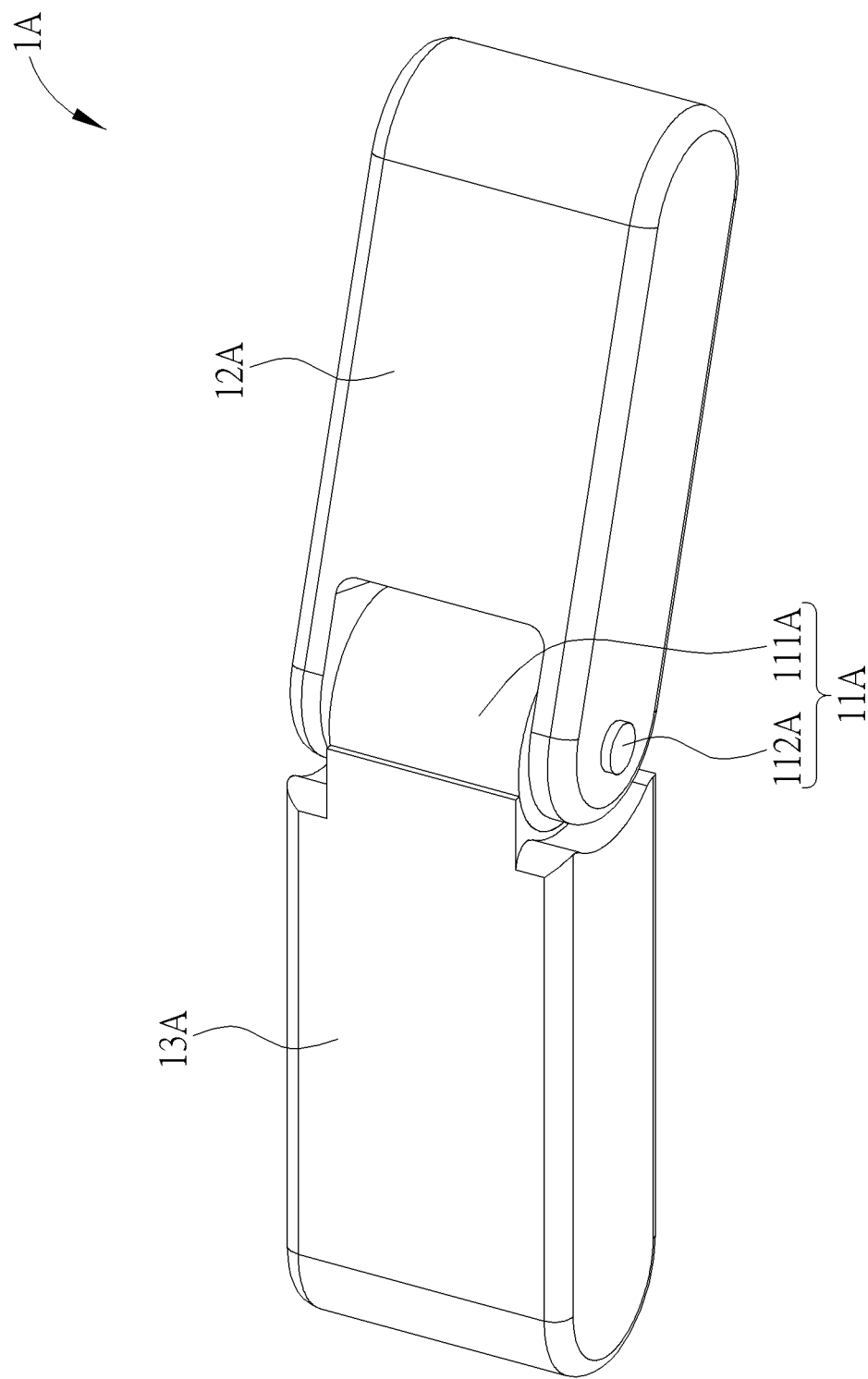
FIG. 1 is a schematic diagram of a wave energy conversion device according to a first embodiment of the present invention.
Figure 2:
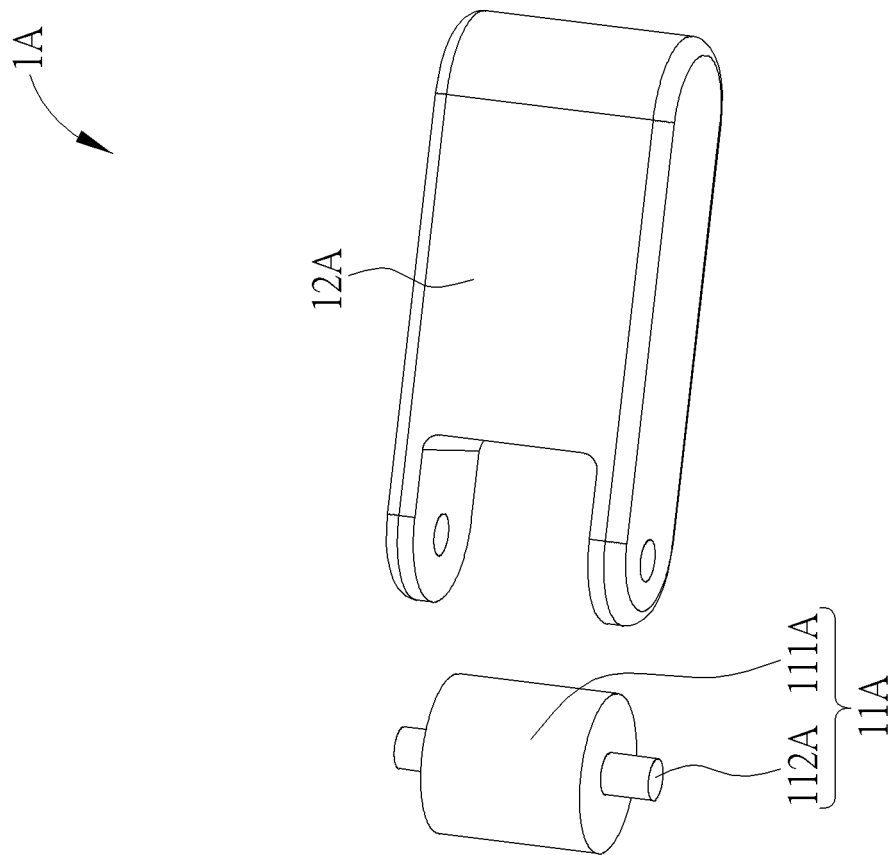
FIG. 2 is an exploded diagram of the wave energy conversion device according to the first embodiment of the present invention.
Figure 2:
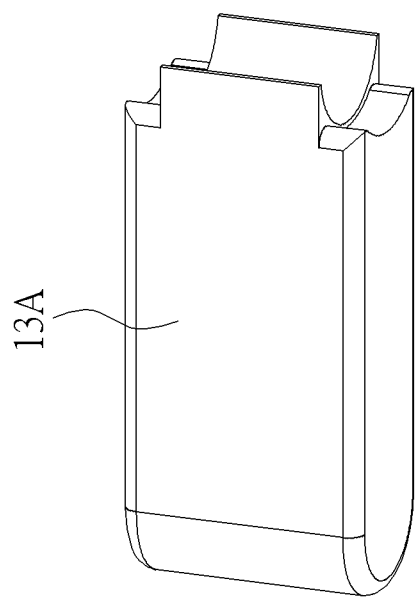
Figure 3:
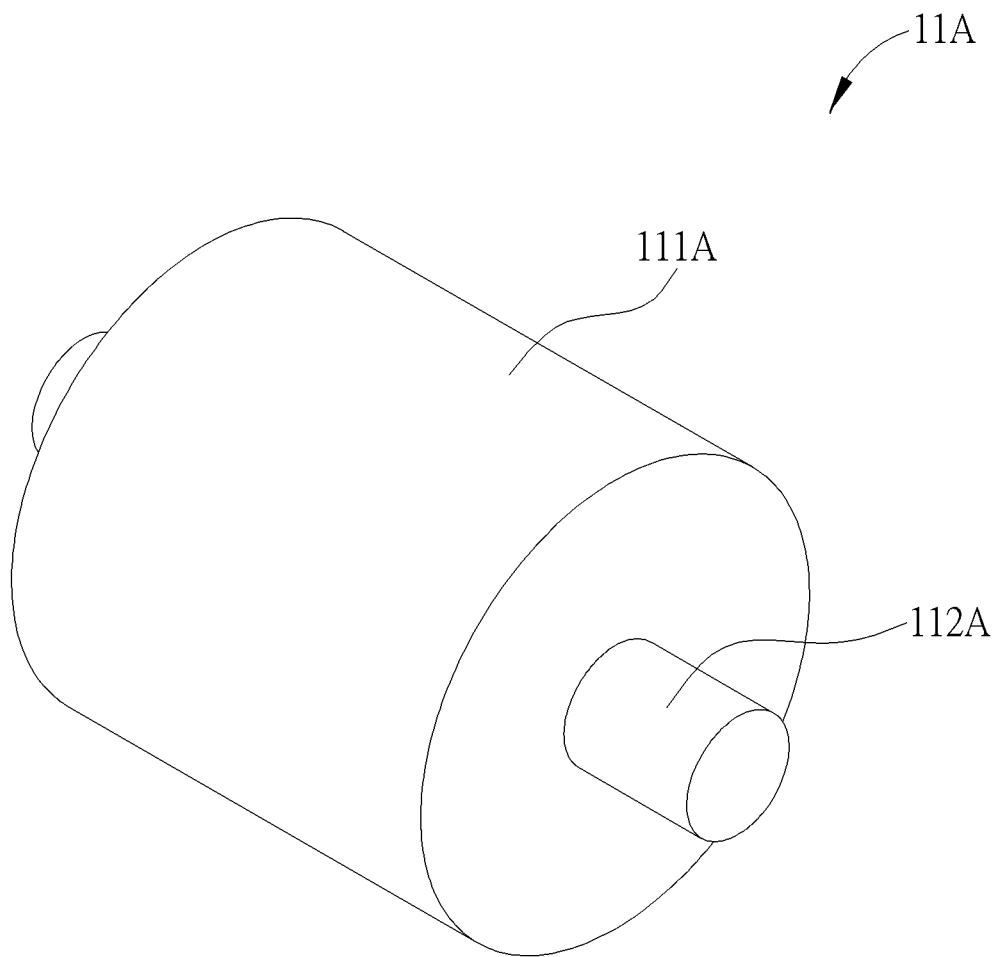
FIG. 3 is a diagram of a permanent magnet generator according to the first embodiment of the present invention.
Figure 4:
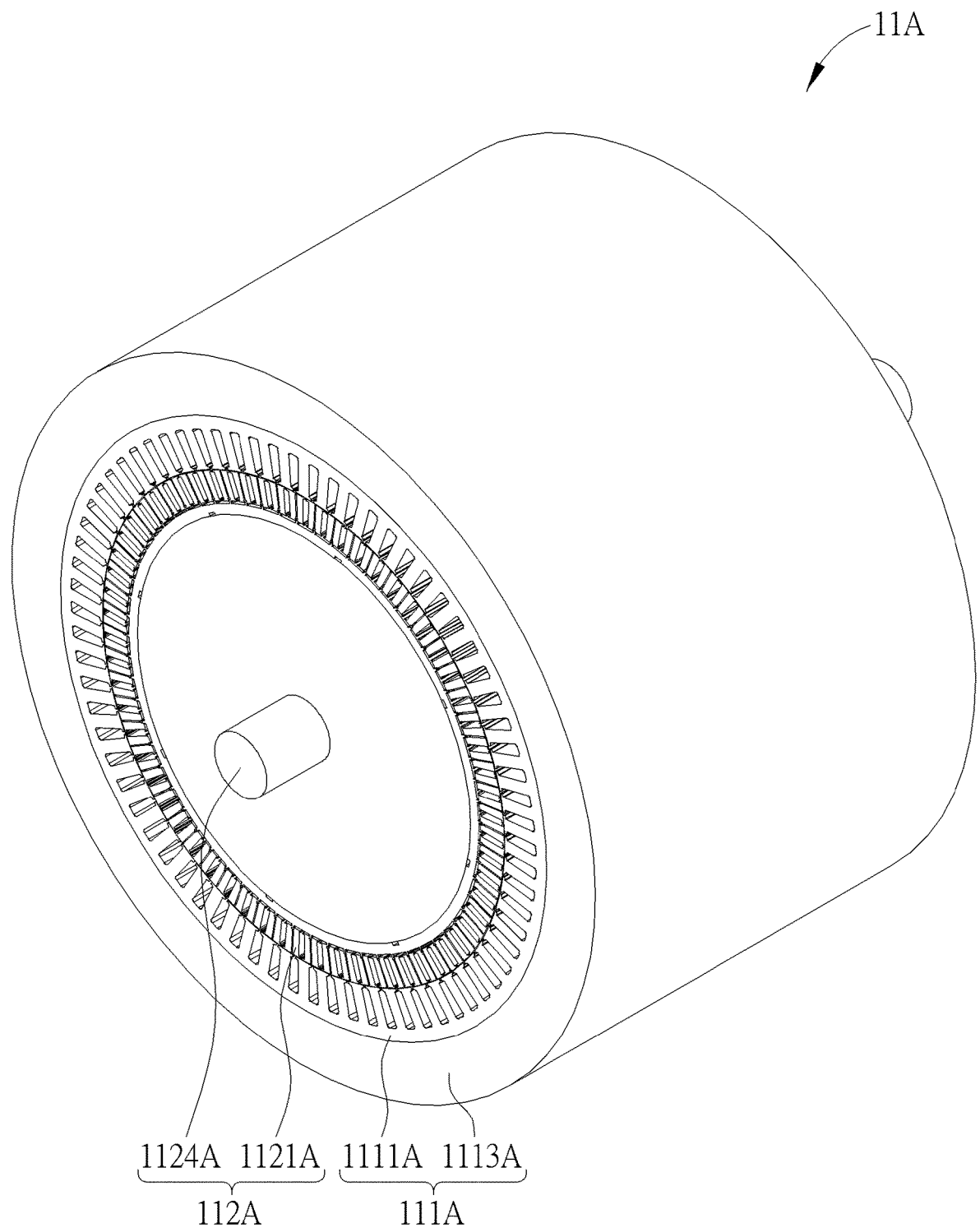
FIG. 4 is a partial diagram of the permanent magnet generator according to the first embodiment of the present invention.
Figure 5:
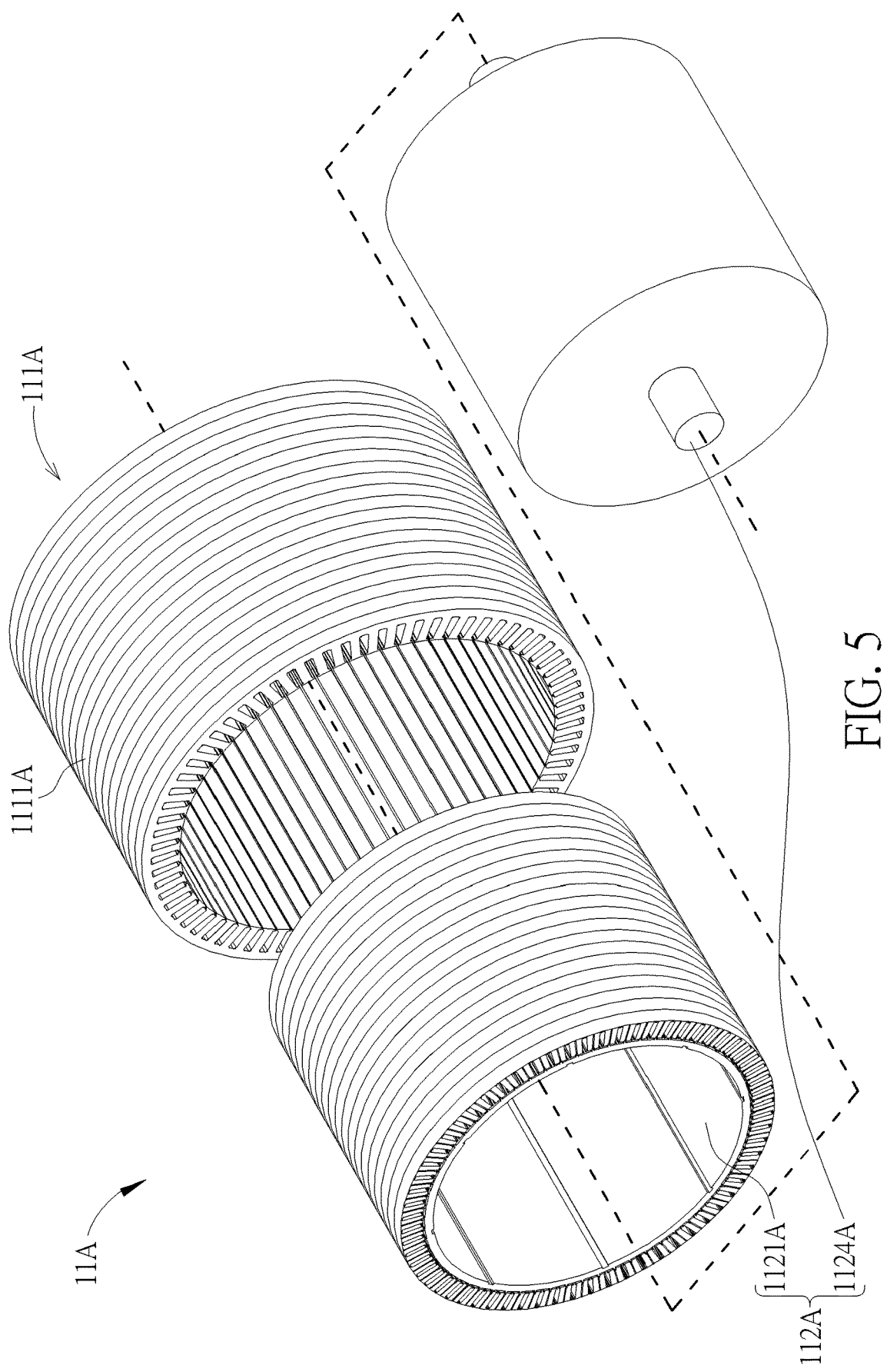
FIG. 5 is a partial exploded diagram of the permanent magnet generator according to the first embodiment of the present invention.
Figure 6:
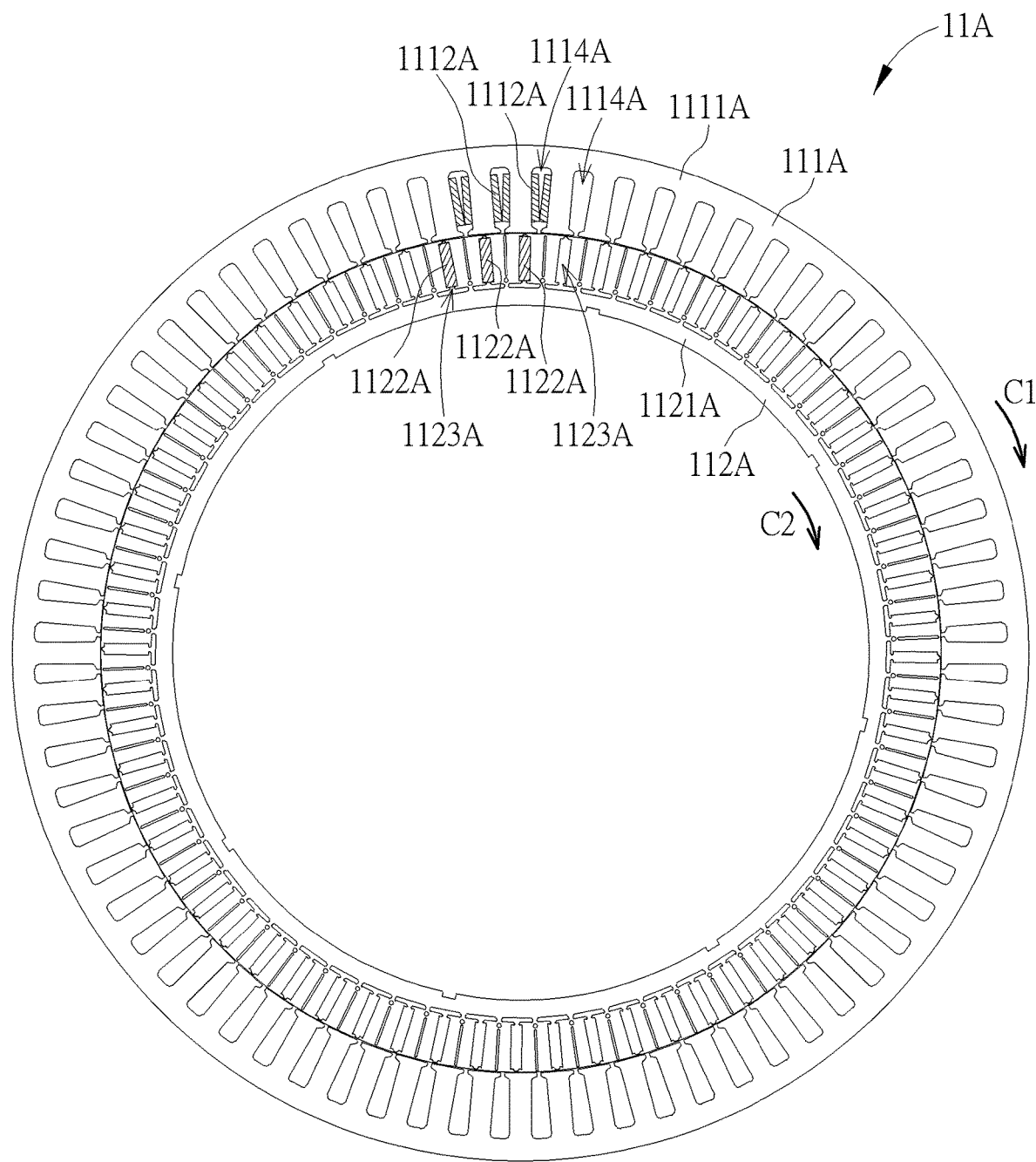
FIG. 6 is a partial sectional diagram of the permanent magnet generator according to the first embodiment of the present invention.

Please refer to FIG. 1 to FIG. 6. FIG. 1 is a schematic diagram of a wave energy conversion device 1A according to a first embodiment of the present invention. FIG. 2 is an exploded diagram of the wave energy conversion device 1A according to the first embodiment of the present invention. FIG. 3 is a diagram of a permanent magnet generator 11A according to the first embodiment of the present invention. FIG. 4 is a partial diagram of the permanent magnet generator 11A according to the first embodiment of the present invention. FIG. 5 is a partial exploded diagram of the permanent magnet generator 11A according to the first embodiment of the present invention. FIG. 6 is a partial sectional diagram of the permanent magnet generator 11A according to the first embodiment of the present invention. As shown in FIG. 1 to FIG. 2, the wave energy conversion device 1A includes the permanent magnet generator 11A, a first driving component 12A and a second driving component 13A. The permanent magnet generator 11A includes a stator structure 111A and a rotor structure 112A. The rotor structure 112A can rotate or swing relative to the stator structure 111A. The first driving component 12A is coupled to the rotor structure 112A. The second driving component 13A is coupled to the stator structure 111A. Each of the first driving component 12A and the second driving component 13A can be a floating component, such as a buoy. However, the present invention is not limited thereto. A wave movement can drive the first driving component 12A and the second driving component 13A to move to drive the rotor structure 112A to rotate or swing relative to the stator structure 111A, so that the stator structure 111A can generate an electrical current by a magnetic field variation during a rotating movement or a swinging movement of the rotor structure 112A relative to the stator structure 111A, so as to achieve a purpose of electricity generation.

As shown in FIG. 4 to FIG. 6, the stator structure 111A includes a stator body 1111A, a plurality of stator coils 1112A and a shell 1113A. The stator body 1111A is fixedly disposed inside the shell 1113A. A plurality of stator slots 1114A are formed on the stator body 1111A. The plurality of stator coils 1112A are wrapped around the plurality of stator slots 1114A for generating the electrical current. Preferably, the stator body 1111A can be a circular column and made of magnetically conductive material, such as silicon steel. Specifically, the stator body 1111A can be formed by a plurality of stacked ring-shaped silicon steel sheets.

The rotor structure 112A includes a rotor body 1121A and a plurality of permanent magnets 1122A. The rotor body 1121A is disposed inside the stator body 1111A in a swinging manner or a rotating manner. A plurality of rotor slots 1123A are formed on the rotor body 1121A. The plurality of permanent magnets 1122A are disposed inside the plurality of rotor slots 1123A, respectively, and the plurality of permanent magnets 1122A are configured to cause a magnetic flux variation when the rotor body 1121A rotates or swings. Preferably, a number of the plurality of permanent magnets 1122A can be identical to a number of the plurality of rotor slots 1123A, that is, each of the plurality of permanent magnets 1122A is installed inside the corresponding rotor slot 1123A. However, in another embodiment, the number of the plurality of permanent magnets can be less than the number of the plurality of rotor slots. Preferably, the rotor body 1121A can be a circular column and made of magnetically conductive material, such as silicon steel. Specifically, the rotor body 1121A can be formed by a plurality of stacked ring-shaped silicon steel sheets.

A central axis of the stator body 1111A is collided with a central axis of the rotor body 1121A. The plurality of stator slots 1114A are arranged along a circumferential direction C1 of the stator body 1111A, and the plurality of rotor slots 1123A are arranged along a circumferential direction C2 of the rotor body 1121A. Preferably, the plurality of stator slots 1114A can be arranged along the circumferential direction C1 of the stator body 1111A at equal intervals, and the plurality of rotor slots 1123A can be arranged along the circumferential direction C2 of the rotor body 1121A at equal intervals.

It should be noticed that, in the present invention, as shown in FIG. 6, a ratio of the number of the plurality of rotor slots 1123A to a number of the plurality of stator slots 1114A is 8:9. Preferably, the number of the plurality of rotor slots 1123A is at least equal to 64, and the number of the plurality of stator slots 1114A is at least equal to 72. Due to the aforementioned configuration, the permanent magnet generator 11A of the present invention not only can generate electricity stably even in a condition of a low speed and a small angle of the rotating movement or the swinging movement of the rotor body 1121A relative to the stator body 1111A but also has better efficiency of electricity generation, which facilitates wave energy conversion.

However, the structure of the permanent magnet generator is not limited to the aforementioned embodiment. It depends on practical demands. For example, in another embodiment, each of the rotor body and the stator body can be formed by a plurality of stacked sector-shaped silicon steel sheets.

As shown in FIG. 1 to FIG. 5, in order to achieve a coupling connection of the first driving component 12A and the rotor structure 112A, the rotor structure 112A further includes a connecting shaft 1124A coupled to the rotor body 1121A. The connecting shaft 1124A passes through the shell 1113A and is connected to the first driving component 12A. Furthermore, in order to achieve a coupling connection of the second driving component 13A and the stator structure 111A, the shell 1113A of the stator structure 111A is connected to the second driving component 13A.

In this embodiment, the wave energy conversion device 1A utilizes the coupling connection of the first driving component 12A and the rotor structure 112A and the coupling connection of the second driving component 13A and the stator structure 111A to convert the wave movement into the rotating movement or the swinging movement of the rotor body 1121A relative to the stator body 1111A by the first driving component 12A and the second driving component 13A. Furthermore, the ratio of the number of the plurality of rotor slots 1123A to the number of the plurality of stator slots 1114A can be 8:9, and the number of the plurality of the rotor slots 1123A and the number of the plurality of the stator slots 1114A can be at least equal to 64 and 72, respectively. Due to the aforementioned configuration, the wave energy conversion device 1A only requires a low speed and a small angle of the rotating movement or the swinging movement of the rotor body 1121A relative to the stator body 1111A, for generating electricity. In other words, in the condition of the low speed and the small angle of the rotating movement or the swinging movement of the rotor body 1121A relative to the stator body 1111, the magnetic flux variation of the permanent magnet generator 11A of the wave energy conversion device 1A still can cause the stator structure 111A to generate an electrical current. Therefore, even if amplitude of the wave movement is small, the wave energy conversion device 1A still can generate electricity stably, which improves reliability and stability of electricity generation. Besides, the wave energy conversion device 1A has simple structure, which reduces maintenance cost.

Specifically, for example, when the number of the plurality of the rotor slots 1123A and the number of the plurality of the stator slots 1114A are equal to 64 and 72, respectively, the stator coils 1112A can generate the electrical current as long as the angle of the rotating movement or the swinging movement of the rotor body 1121A relative to the stator body 1111A reaches 22.5 degrees. Therefore, even if the rotor body 1121A is driven by the waves to swing relative to the stator body 1111A at a small angle back and forth instead of rotating relative to the stator body 1111A along a fixed direction, the permanent magnet generator 11A still can generate electricity. Furthermore, understandably, when the number of the plurality of the rotor slots 1123A and the number of the plurality of the stator slots 1114A are greater than 64 and 72, respectively, the angle of the rotating movement or the swinging movement of the rotor body 1121A relative to the stator body 1111A which is required for the stator coils 1112A to generate the electrical current is less than 22.5 degrees, which allows the permanent magnet generator 11A to generate electricity when the rotor body 1121A is driven by the waves to swing relative to the stator body 1111A at a smaller angle back and forth.

Figure 7:
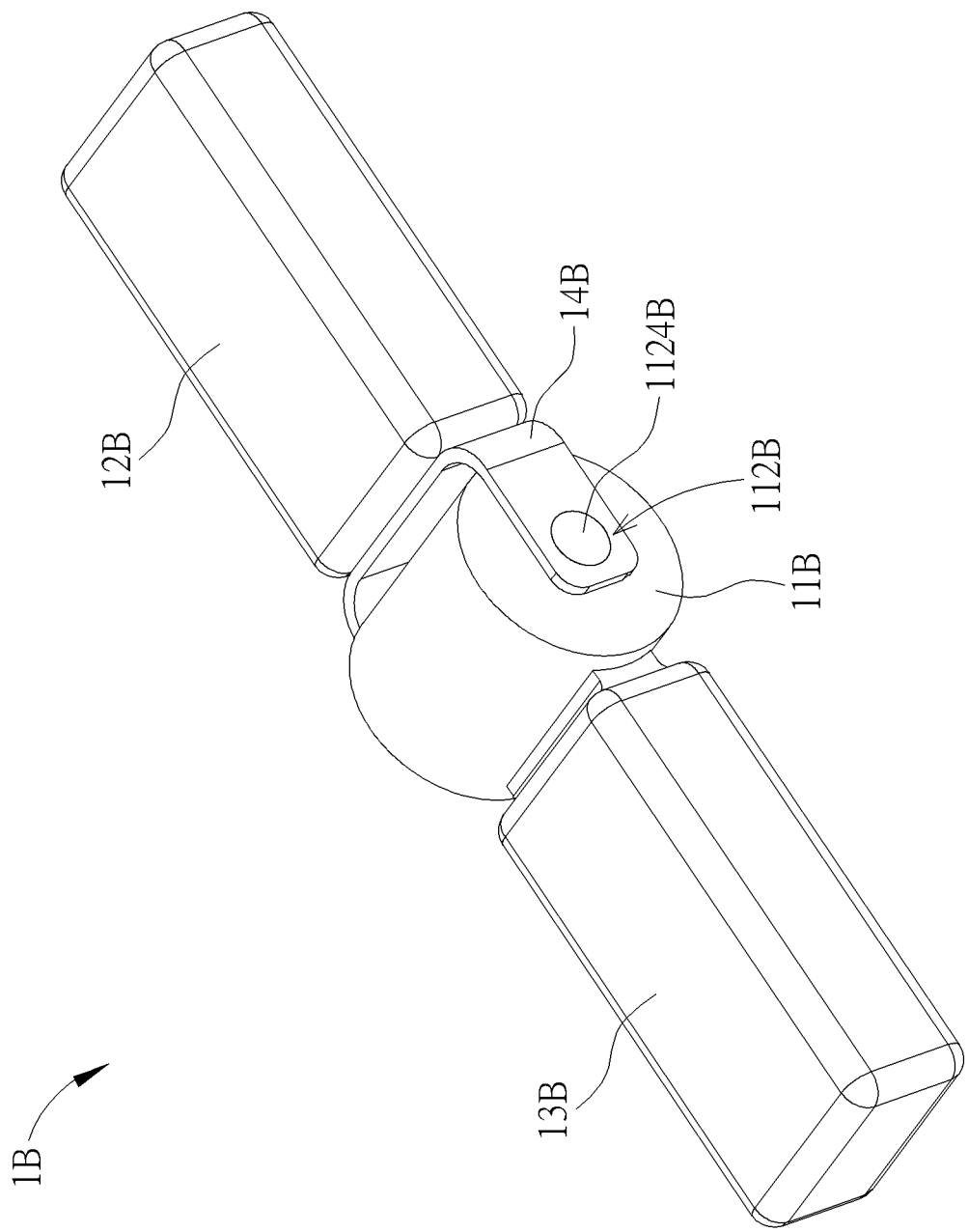
FIG. 7 is a schematic diagram of a wave energy conversion device according to a second embodiment of the present invention.
Figure 8:
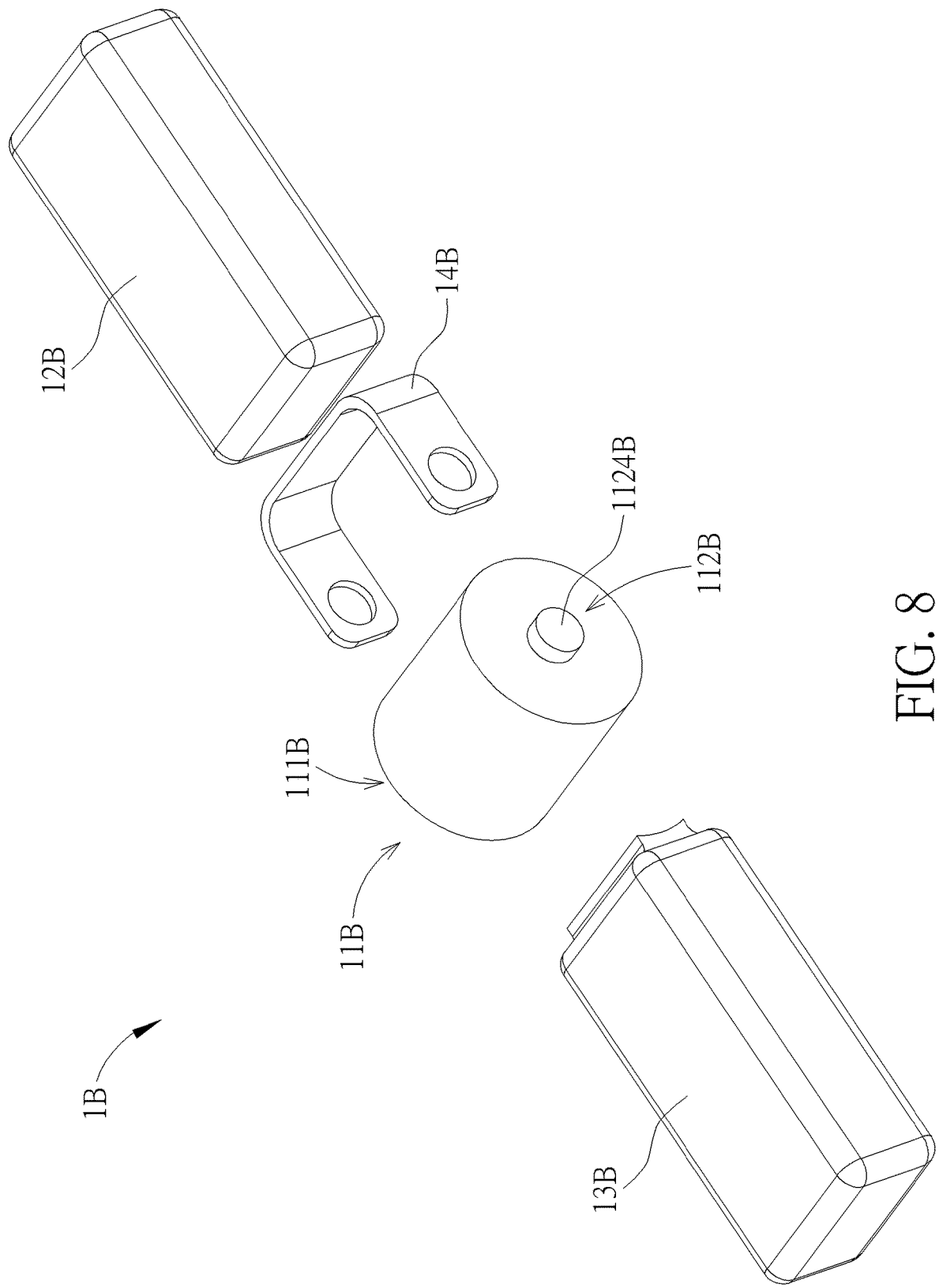
FIG. 8 is an exploded diagram of the wave energy conversion device according to the second embodiment of the present invention.

However, the structures of the first driving component and the second driving component are not limited to the ones illustrated in the figures of the aforementioned embodiment. For example, please refer to FIG. 7 to FIG. 8. FIG. 7 is a schematic diagram of a wave energy conversion device 1B according to a second embodiment of the present invention. FIG. 8 is an exploded diagram of the wave energy conversion device 1B according to the second embodiment of the present invention. As shown in FIG. 7 to FIG. 8, in this embodiment, the wave energy conversion device 1B includes a permanent magnet generator 11B, a first driving component 12B and a second driving component 13B. The structure of the permanent magnet generator 11B of this embodiment is similar to the one of the permanent magnet generator 11A of the first embodiment. Detailed description is omitted herein for simplicity. Different from the first embodiment, in this embodiment, the first driving component 12B is connected to a connecting shaft 1124B of a rotor structure 112B of the permanent magnet generator 11B by a connecting frame 14B. The wave energy conversion device 1B utilizes a connection of the connecting frame 14B and the connecting shaft 1124B to achieve a coupling connection of the first driving component 12B and the rotor structure 112B and further utilizes the coupling connection of the first driving component 12B and the rotor structure 112B and a coupling connection of the second driving component 13B and a stator structure 111B to convert a wave movement into a rotating movement or a swinging movement of a rotor body of the rotor structure 112B relative to a stator body of the stator structure 111B by the first driving component 12B and the second driving component 13B, so as to achieve a purpose of electricity generation by the wave energy conversion.

Figure 9:
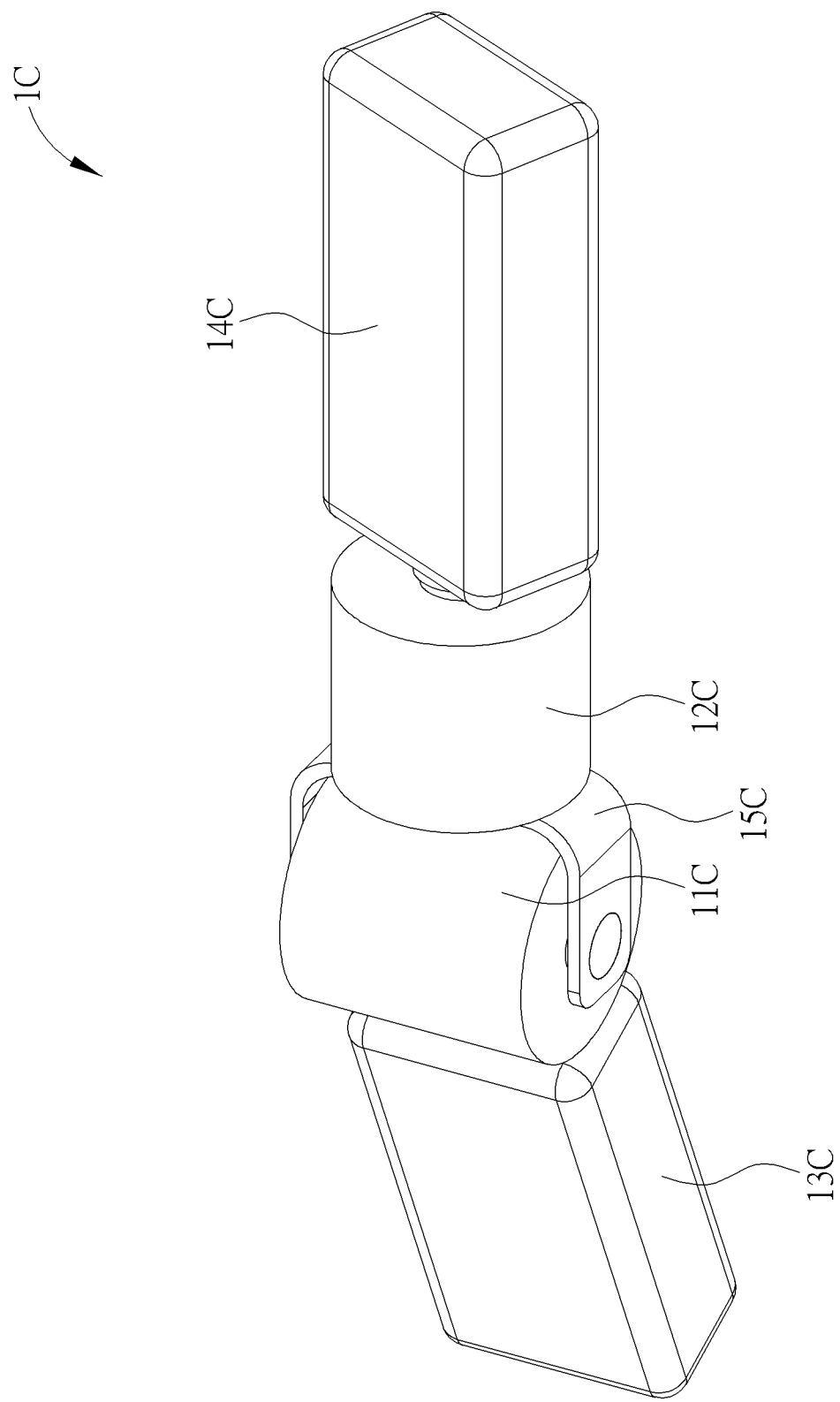
FIG. 9 is a schematic diagram of a dual-axial wave energy conversion device according to a third embodiment of the present invention.
Figure 10:
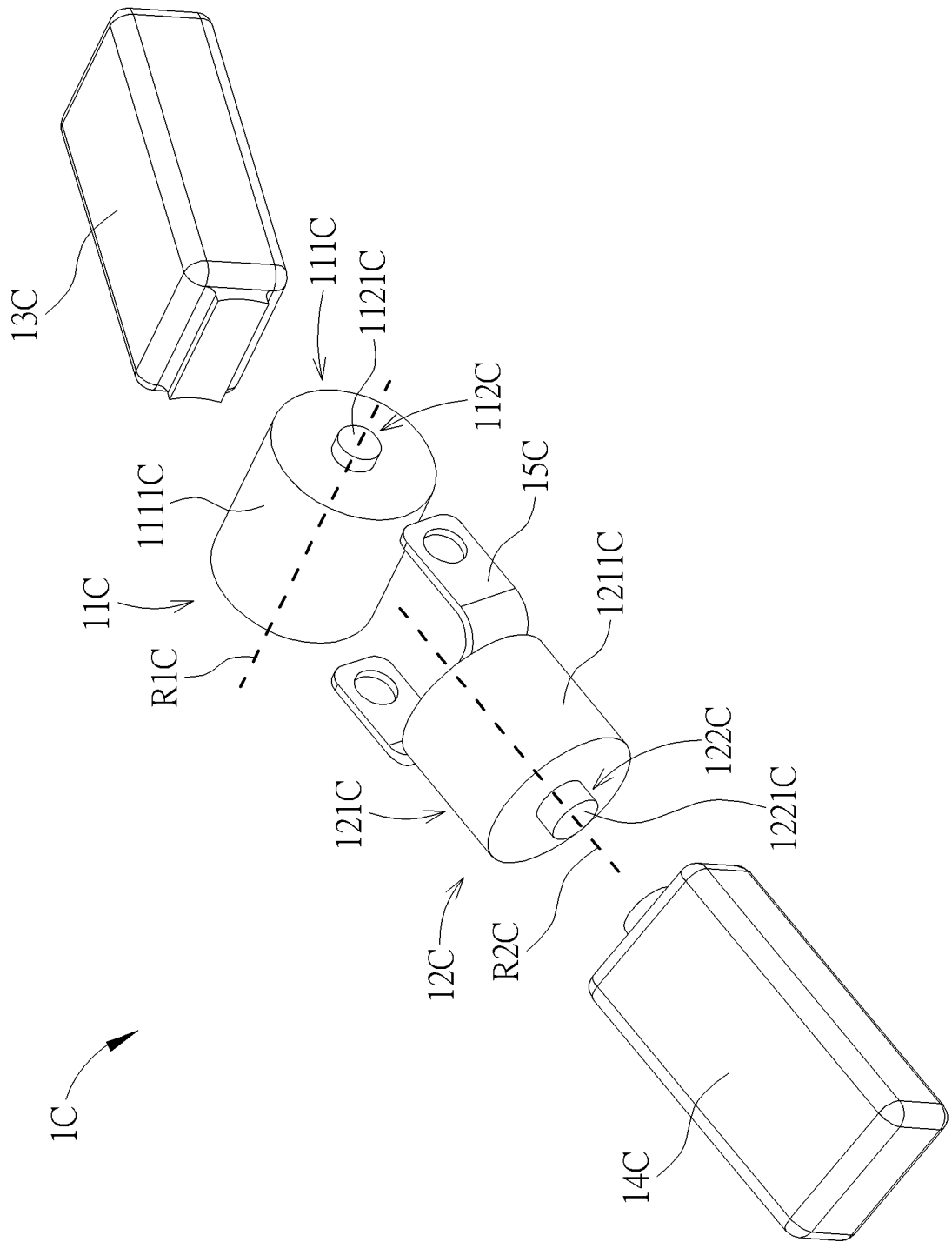
FIG. 10 is an exploded diagram of the dual-axial wave energy conversion device according to the third embodiment of the present invention.

Besides, please refer to FIG. 9 to FIG. 10. FIG. 9 is a schematic diagram of a dual-axial wave energy conversion device 1C according to a third embodiment of the present invention. FIG. 10 is an exploded diagram of the dual-axial wave energy conversion device 1C according to the third embodiment of the present invention. As shown in FIG. 9 to FIG. 10, the dual-axial wave energy conversion device 1C includes a first permanent magnet generator 11C, a second permanent magnet generator 12C, a first driving component 13C and a second driving component 14C. Each of the first driving component 13C and the second driving component 14C can be a floating component. However, the present invention is not limited thereto. The internal structure of each of the first permanent magnet generator 11C and the second permanent magnet generator 12C is similar to the one of the permanent magnet generator 11A of the first embodiment. Detailed description for the internal structures of the first permanent magnet generator 11C and the second permanent magnet generator 12C is omitted herein for simplicity, and related illustration can be referred to the first embodiment. Different from the first embodiment, in this embodiment, a second stator structure 121C of the second permanent magnet generator 12C is coupled to a first rotor structure 112C of the first permanent magnet generator 11C. The first driving component 13C is coupled to a first stator structure 111C of the first permanent magnet generator 11C. The second driving component 14C is coupled to a second rotor structure 122C of the second permanent magnet generator 12C. A swinging direction or a rotating direction of a second rotor body, which is not shown in the figures, of the second rotor structure 122C of the second permanent magnet generator 12C is different from a swinging direction or a rotating direction of a first rotor body, which is not shown in the figures, of the first rotor structure 112C of the first permanent magnet generator 11C. Preferably, a first central axis R1C of the first rotor body can be perpendicular to a second central axis R2C of the second rotor body, so that the swinging direction or the rotating direction of the second rotor body of the second rotor structure 122C of the second permanent magnet generator 12C can be different from the swinging direction or the rotating direction of the first rotor body of the first rotor structure 112C of the first permanent magnet generator 11C. Therefore, the first permanent magnet generator 11C and the second permanent magnet generator 12C can convert wave energy transmitted along different directions into electricity.

Specifically, only one end of a second connecting shaft 1221C of the second rotor structure 122C of the second permanent magnet generator 12C protrudes out of a second shell 1211C of the second stator structure 121C, and the end of the second connecting shaft 1221C protruding out of the second shell 1211C is connected to the second driving component 14C. The second shell 1211C of the second stator structure 121C is connected to a first connecting shaft 1121C of the first rotor structure 112C of the first permanent magnet generator 11C by a connecting frame 15C. A first shell 1111C of the first stator structure 111C of the first permanent magnet generator 11C is connected to the first driving component 13C. However, the present invention is not limited to this embodiment. In another embodiment, another end of the second connecting shaft away from the second driving component also can be configured to be protruding out of the second shell and coupled to the connecting frame, i.e., the connecting frame is not connected to the second shell.

In this embodiment, the dual-axial wave energy conversion device 1C can convert the wave movements along different directions into a rotating movement or a swinging movement of the first rotor body of the first rotor structure 112C relative to a first stator body of the first stator structure 111C and a rotating movement or a swinging movement of the second rotor body of the second rotor structure 122C relative to a second stator body of the second stator structure 121C. Therefore, even if the wave direction is changed by wind, the dual-axial wave energy conversion device 1C still can generate electricity stably, which improves reliability and stability of electricity generation.

Figure 11:
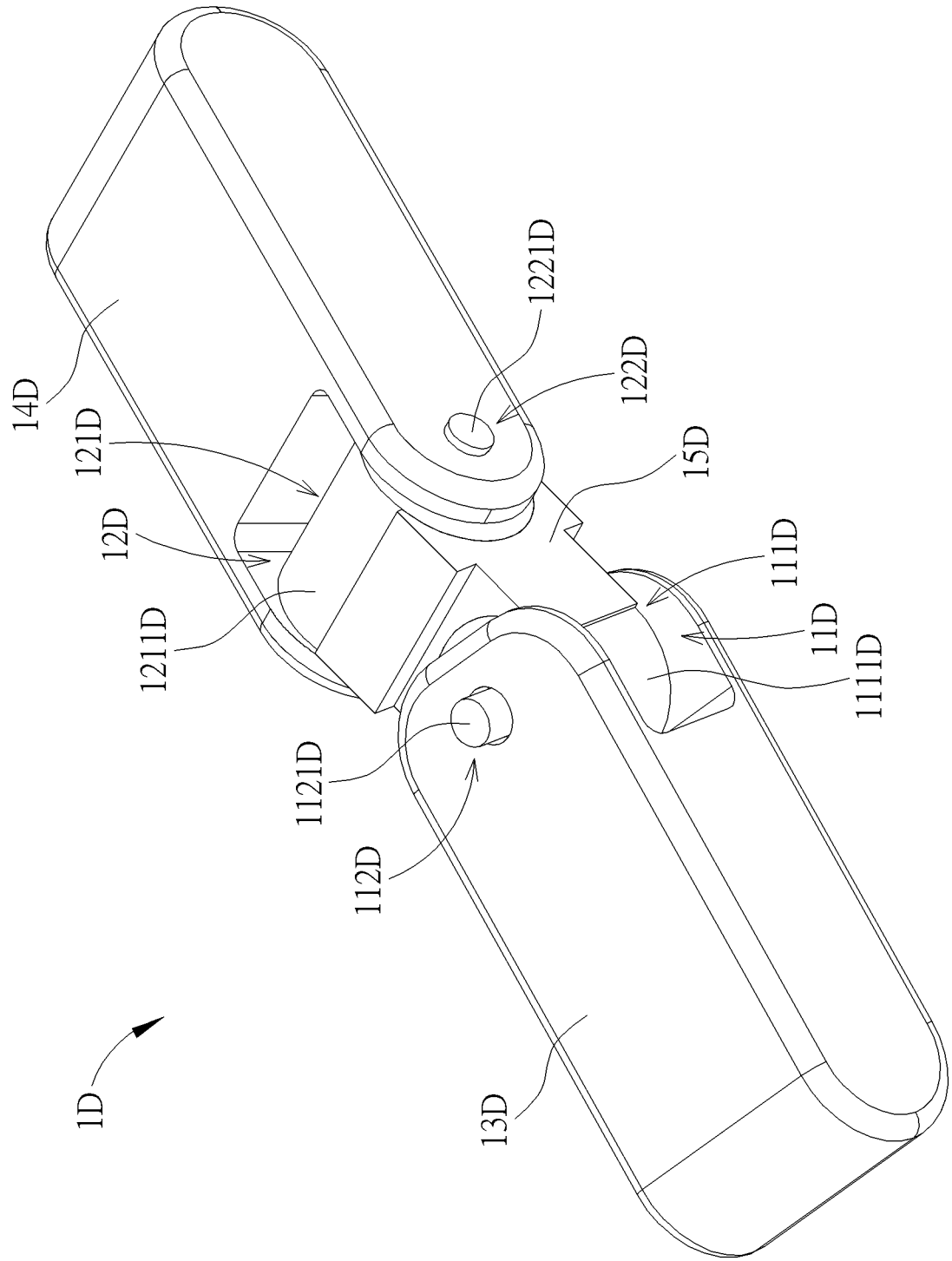
FIG. 11 is a schematic diagram of a dual-axial wave energy conversion device according to a fourth embodiment of the present invention.
Figure 12:
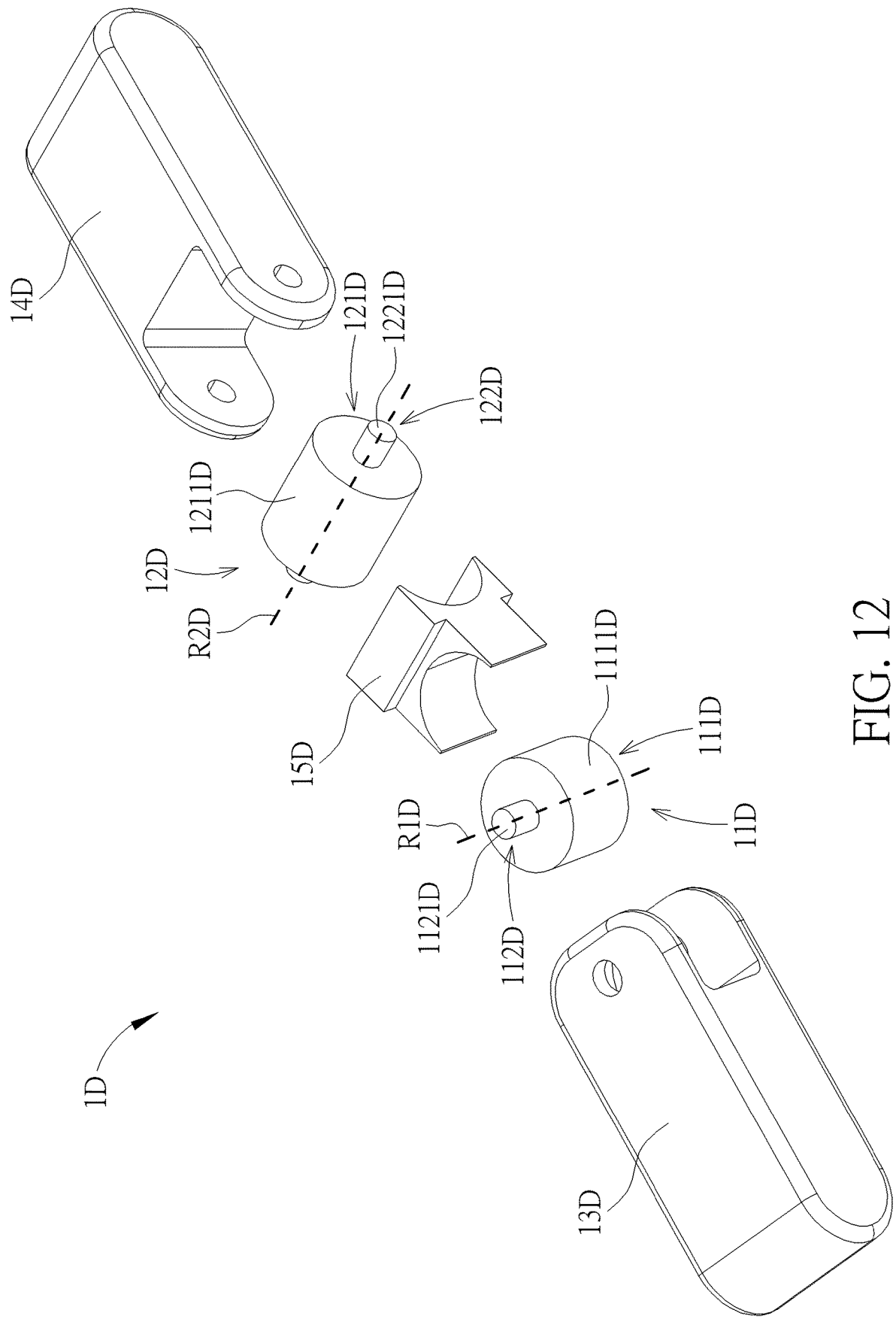
FIG. 12 is an exploded diagram of the dual-axial wave energy conversion device according to the fourth embodiment of the present invention.

Please refer to FIG. 11 and FIG. 12. FIG. 11 is a schematic diagram of a dual-axial wave energy conversion device 1D according to a fourth embodiment of the present invention. FIG. 12 is an exploded diagram of the dual-axial wave energy conversion device 1D according to the fourth embodiment of the present invention. As shown in FIG. 11 and FIG. 12, the dual-axial wave energy conversion device 1D includes a first permanent magnet generator 11D, a second permanent magnet generator 12D, a first driving component 13D and a second driving component 14D. Each of the first driving component 13D and the second driving component 14D can be a floating component. However, the present invention is not limited thereto. The internal structure of each of the first permanent magnet generator 11D and the second permanent magnet generator 12D is similar to the one of the permanent magnet generator 11A of the first embodiment. Detailed description for the internal structures of each of the first permanent magnet generator 11D and the second permanent magnet generator 12D is omitted herein for simplicity, and related illustration can be referred to the first embodiment. Different from the first embodiment, in this embodiment, a second stator structure 121D of the second permanent magnet generator 12D is coupled to a first stator structure 111D of the first permanent magnet generator 11D. The second driving component 14D is coupled to a second rotor structure 122D of the second permanent magnet generator 12D. A swinging direction or a rotating direction of a second rotor body, which is not shown in the figures, of the second rotor structure 122D of the second permanent magnet generator 12D is different from a swinging direction or a rotating direction of a first rotor body, which is not shown in the figures, of the first rotor structure 112D of the first permanent magnet generator 11D. Preferably, a first central axis R1D of the first rotor body can be perpendicular to a second central axis R2D of the second rotor body, so that the swinging direction or the rotating direction of the second rotor body of the second rotor structure 122D of the second permanent magnet generator 12D can be different from the swinging direction or the rotating direction of the first rotor body of the first rotor structure 112D of the first permanent magnet generator 11D. Therefore, the first permanent magnet generator 11D and the second permanent magnet generator 12D can convert wave energy transmitted along different directions into electricity.

Specifically, two ends of a second connecting shaft 1221D of the second rotor structure 122D of the second permanent magnet generator 12D protrude out of a second shell 1211D of the second stator structure 121D and are connected to the second driving component 14D. The second shell 1211D of the second stator structure 121D is connected to a first shell 1111D of the first stator structure 111D of the first permanent magnet generator 11D by a connecting frame 15D. A first connecting shaft 1121D of the first rotor structure 112D is connected to the first driving component 13D.

In this embodiment, the dual-axial wave energy conversion device 1D can convert the wave movements along different directions into a rotating movement or a swinging movement of the first rotor body of the first rotor structure 112D relative to a first stator body of the first stator structure 111D and a rotating movement or a swinging movement of the second rotor body of the second rotor structure 122D relative to a second stator body of the second stator structure 121D. Therefore, even if the wave direction is changed by wind, the dual-axial wave energy conversion device 1D still can generate electricity stably, which improves reliability and stability of electricity generation.

Figure 13:
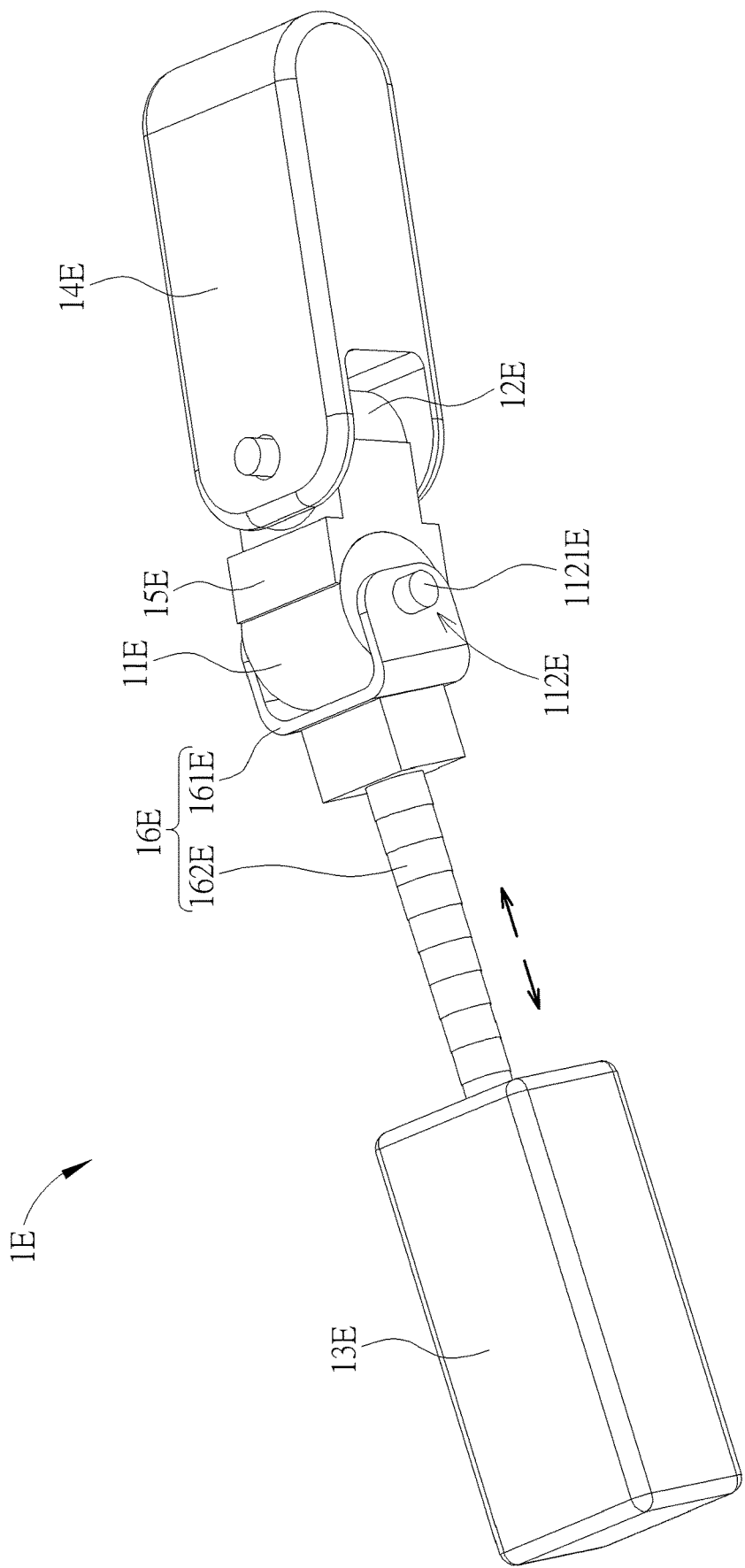
FIG. 13 and FIG. 14 are schematic diagrams of a dual-axial wave energy conversion device in different states according to a fifth embodiment of the present invention.
Figure 14:
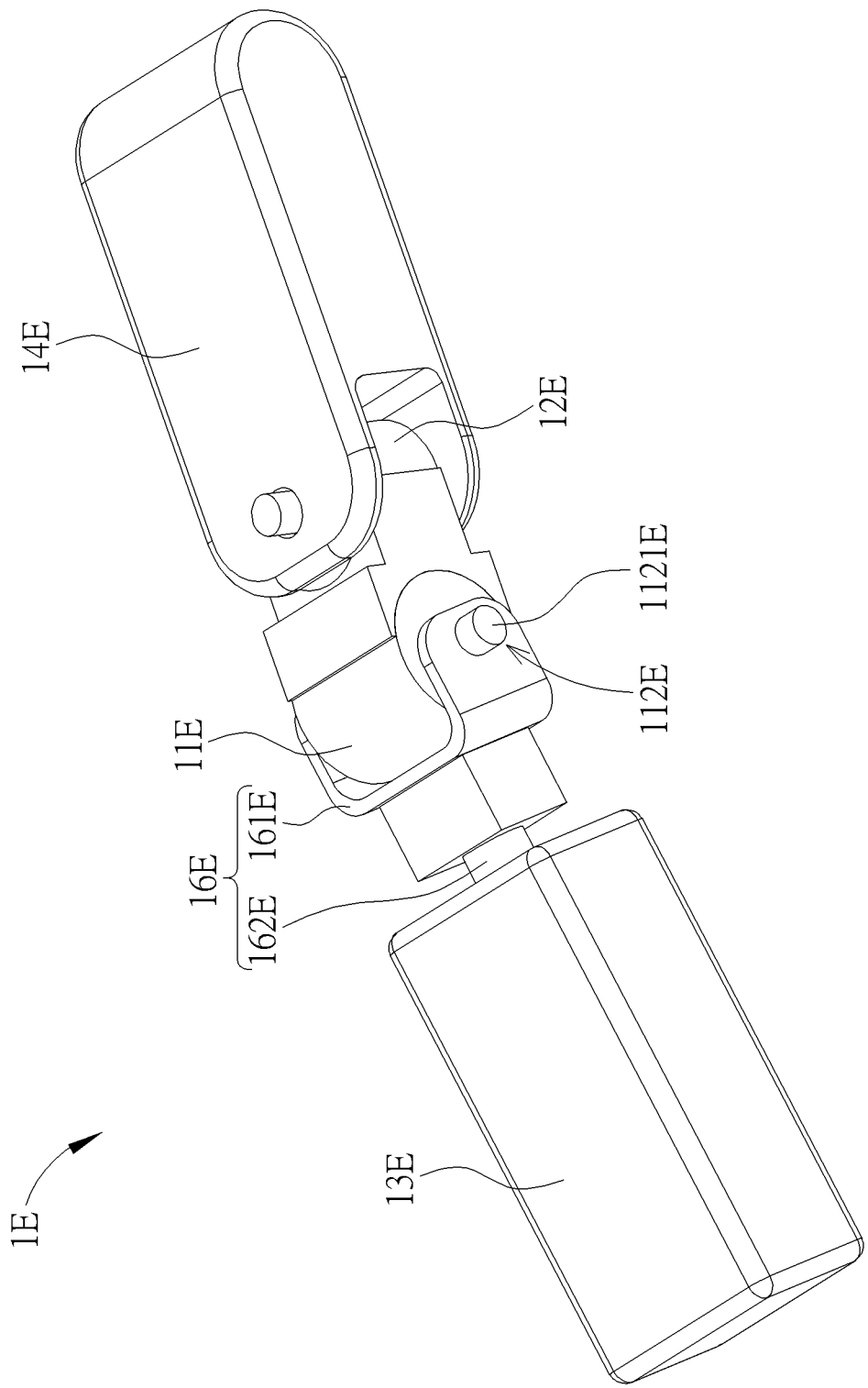

Please refer to FIG. 13 and FIG. 14. FIG. 13 and FIG. 14 are schematic diagrams of a dual-axial wave energy conversion device 1E in different states according to a fifth embodiment of the present invention. As shown in FIG. 13 and FIG. 14, the dual-axial wave energy conversion device 1E includes a first permanent magnet generator 11E, a second permanent magnet generator 12E, a first driving component 13E, a second driving component 14E and a connecting frame 15E. Each of the first driving component 13E and the second driving component 14E can be a floating component. However, the present invention is not limited thereto. The structures of the first permanent magnet generator 11E, the second permanent magnet generator 12E, the first driving component 13E, the second driving component 14E and the connecting frame 15E are similar to the ones of the fourth embodiment. Detailed description for the similar structures is omitted herein for simplicity. Different from the fourth embodiment, in this embodiment, the dual-axial wave energy conversion device 1E further includes an extending and retracting assembly 16E connected between the first permanent magnet generator 11E and the first driving component 13E and configured to move the first driving component 13E for increasing or reducing a distance between the first driving component 13E and the second driving component 14E for adapting to different waves.

Specifically, the extending and retracting assembly 16E includes a supporting frame 161E and an extending and retracting rod 162E. The supporting frame 161E is connected to a first connecting shaft 1121E of a first rotor structure 112E of the first permanent magnet generator 11E. Two ends of the extending and retracting rod 162E are connected to the supporting frame 161E and the first driving component 13E, respectively. The extending and retracting rod 162 can drive the first driving component 13E to move by hydraulic, electric or pneumatic means to increase or reduce the distance between the first driving component 13E and the second driving component 14E.

However, the present invention is not limited to this embodiment. In another embodiment, the extending and retracting assembly can be connected between the second permanent magnet generator and the second driving component to move the second driving component for increasing or reducing the distance between the first driving component and the second driving component. Alternatively, in another embodiment, the dual-axial wave energy conversion device can include two extending and retracting assemblies, wherein one of the two extending and retracting assemblies is connected between the first driving component and the first permanent magnet generator, and the other one of the two extending and retracting assemblies is connected between the second driving component and the second permanent magnet generator.

Figure 15:
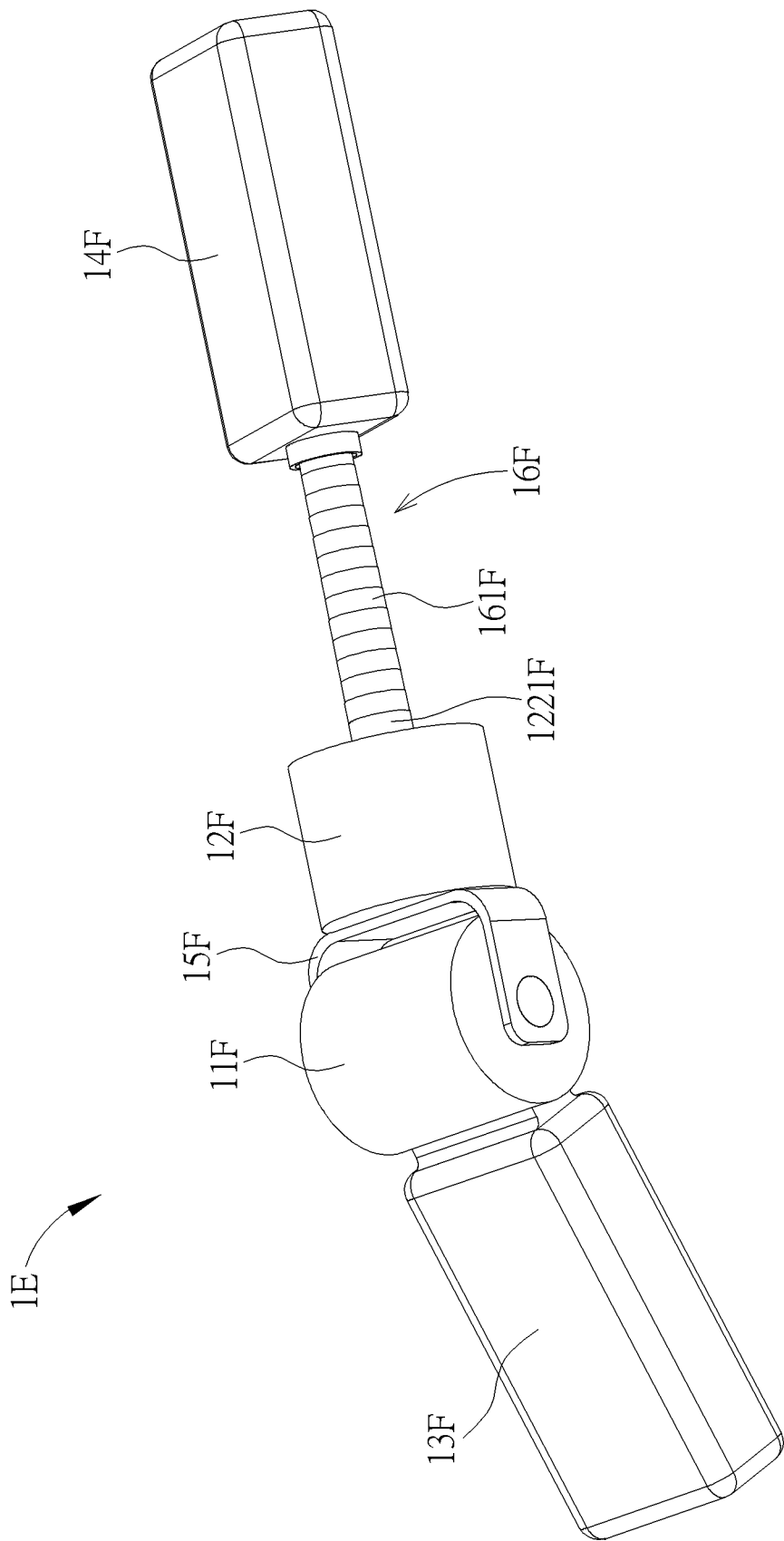
FIG. 15 is a schematic diagram of a dual-axial wave energy conversion device according to a sixth embodiment of the present invention.

Please refer to FIG. 15. FIG. 15 is a schematic diagram of a dual-axial wave energy conversion device 1F according to a sixth embodiment of the present invention. As shown in FIG. 15, the dual-axial wave energy conversion device 1F of this embodiment includes a first permanent magnet generator 11F, a second permanent magnet generator 12F, a first driving component 13F, a second driving component 14F and a connecting frame 15F. Each of the first driving component 13F and the second driving component 14F can be a floating component. However, the present invention is not limited thereto. The structures of the first permanent magnet generator 11F, the second permanent magnet generator 12F, the first driving component 13F, the second driving component 14F and the connecting frame 15F are similar to the ones of the third embodiment. Detailed description for the similar structures is omitted herein for simplicity. Different from the third embodiment, in this embodiment, the dual-axial wave energy conversion device 1F further includes a extending and retracting assembly 16F connected to the second permanent magnet generator 12F and the second driving component 14F and configured to move the second driving component 14F for increasing or reducing a distance between the first driving component 13F and the second driving component 14F for adapting to different waves.

Specifically, the extending and retracting assembly 16F includes an extending and retracting rod 161F connected to a second connecting shaft 1221F of the second permanent magnet generator 12F and the second driving component 14F.

Furthermore, the structure of the dual-axial wave energy conversion device is not limited to the aforementioned embodiments. For example, in another embodiment, when the first driving component is coupled to the first rotor structure, the first stator structure and the second driving component can be coupled to one of the second rotor structure and the second stator structure and the other one of the second rotor structure and the second stator structure, respectively. Alternatively, in another embodiment, when the first driving component is coupled to the first stator structure, the first rotor structure and the second driving component can be coupled to one of the second rotor structure and the second stator structure and the other one of the second rotor structure and the second stator structure, respectively.

Figure 16:
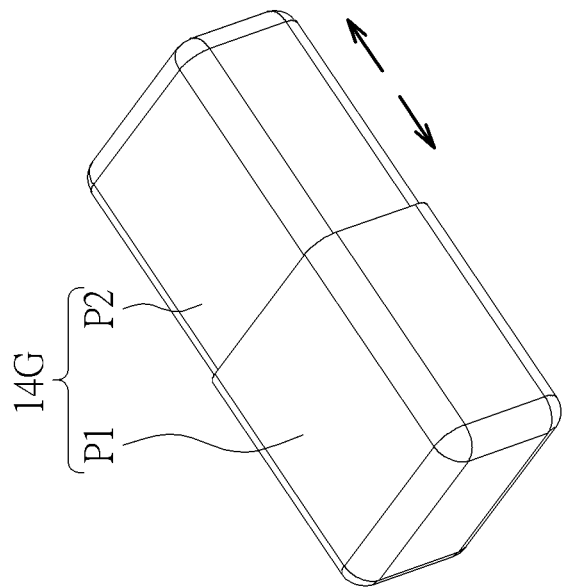
FIG. 16 is a diagram of a first driving component and a second driving component according to another embodiment of the present invention.
Figure 16:
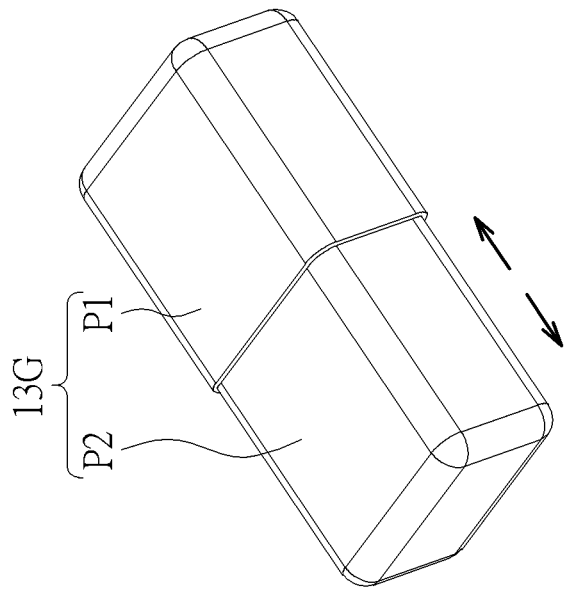

In addition, the structures of the first driving component and the second driving component are not limited to the ones illustrated in the figures of the aforementioned embodiments. The first driving component and/or the second driving component of any of the aforementioned embodiments can be modified to be extendable and retractable according to practical demands for improving adaptation to different waves. For example, please refer to FIG. 16. FIG. 16 is a diagram of a first driving component 13G and a second driving component 14G according to another embodiment of the present invention. As shown in FIG. 16, each of the first driving component 13G and the second driving component 14G of this embodiment can be a floating component including a first portion P1 and a second portion P2, wherein the second portion P2 can be driven by hydraulic, electric or pneumatic means to move relative to the first portion P1 for increasing or reducing a total length of the floating component.

Besides, the wave energy conversion device or the dual-axial wave energy conversion device of any of the aforementioned embodiments can be further coupled to another driving component, another permanent magnet generator, or another wave energy conversion device or another dual-axial wave energy conversion device with identical or different structure, to form a multi-sectional wave energy conversion apparatus.

In contrast to the prior art, the wave energy conversion device of the present invention utilizes the coupling connection of the first driving component and the rotor structure and the coupling connection of the second driving component and the stator structure to convert the wave movement into the rotating movement or the swinging movement of the rotor body relative to the stator body by the first driving component and the second driving component. Furthermore, the ratio of the number of the plurality of rotor slots to the number of the plurality of stator slots can be 8:9, and the number of the plurality of the rotor slots and the number of the plurality of the stator slots can be at least equal to 64 and 72, respectively. Due to the aforementioned configuration, the wave energy conversion device only requires a low speed and a small angle of the rotating movement or the swinging movement of the rotor body relative to the stator body, for generating electricity. Therefore, even if amplitude of the wave movement is small, the wave energy conversion device can generate electricity stably, which improves reliability and stability of electricity generation. Besides, the wave energy conversion device has simple structure, which reduces maintenance cost. In addition, the dual-axial wave energy conversion of the present invention utilizes the coupling connection of the first driving component and the first permanent magnet generator, the coupling connection of the second driving component and the second permanent magnet generator and the coupling connection of the first permanent magnet generator and the second permanent magnet generator to convert wave movements along different directions into a rotating movement or a swinging movement of the first rotor body relative to the first stator body and a rotating movement or a swinging movement of the second rotor body relative to the second stator body by the first driving component and the second driving component. Moreover, the structure of each of the first permanent magnet generator and the second permanent magnet generator of the dual-axial wave energy conversion device is similar to the one of the permanent magnet generator of the wave energy conversion device. Due to the aforementioned configuration, the dual-axial wave energy conversion device only requires a low speed and a small angle of the rotating movement or the swinging movement of the first rotor body relative to the first stator body and a low speed and a small angle of the rotating movement or the swinging movement of the second rotor body relative to the second stator body but does not require a fixed wave direction, for generating electricity. Therefore, even if amplitude of the wave movement is small and the wave direction is changed by wind, the dual-axial wave energy conversion device still can generate electricity stably, which improves reliability and stability of electricity generation. Besides, the dual-axial wave energy conversion device has simple structure, which reduces maintenance cost.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A wave energy conversion device comprising:
a permanent magnet generator comprising:
a stator structure comprising a stator body and a plurality of stator coils, a plurality of stator slots being formed on the stator body, the plurality of stator slots being arranged along a circumferential direction of the stator body, and the plurality of stator coils being wrapped around the plurality of stator slots; and
a rotor structure comprising a rotor body and a plurality of permanent magnets, the rotor body being disposed inside the stator body in a swinging manner or a rotating manner, a plurality of rotor slots being formed on the rotor body, a central axis of the stator body being coincided with a central axis of the rotor body, the plurality of rotor slots being arranged along a circumferential direction of the rotor body, the plurality of permanent magnets being respectively disposed inside the plurality of rotor slots, and a number of the plurality of permanent magnets being identical to a number of the plurality of rotor slots;
a first driving component coupled to the rotor structure; and
a second driving component coupled to the stator structure.

2. The wave energy conversion device of claim 1, wherein the stator structure further comprises a shell, and the stator body is fixedly disposed inside the shell.

3. The wave energy conversion device of claim 2, wherein the rotor structure further comprises a connecting shaft coupled to the rotor body, the connecting shaft passes through the shell and is coupled to the first driving component, and the shell is coupled to the second driving component.

4. The wave energy conversion device of claim 1, wherein each of the stator body and the rotor body is formed by a plurality of silicon steel sheets.

5. The wave energy conversion device of claim 1, wherein each of the first driving component and the second driving component is a floating component.

6. The wave energy conversion device of claim 5, wherein the floating component comprises a first portion and a second portion, and the second portion is movable relative to the first portion to increase or reduce a total length of the floating component.

7. A dual-axial wave energy conversion device comprising:
a first permanent magnet generator comprising a first stator structure and a first rotor structure, the first stator structure comprising a first stator body and a plurality of first stator coils, the first rotor structure comprising a first rotor body and a plurality of first permanent magnets, the first rotor body being disposed inside the first stator body in a swinging manner or in a rotating manner, a plurality of first stator slots being formed on the first stator body, a plurality of first rotor slots being formed on the first rotor body, a central axis of the first stator body being coincided with a central axis of the first rotor body, the plurality of first stator slots being arranged along a circumferential direction of the first stator body, the plurality of first rotor slots being arranged along a circumferential direction of the first rotor body, the plurality of first permanent magnets being respectively disposed inside the plurality of first rotor slots, a number of the plurality of first permanent magnets being identical to a number of the plurality of first rotor slots, and the plurality of first stator coils being wrapped around the plurality of first stator slots;
a second permanent magnet generator comprising a second stator structure and a second rotor structure, the second stator structure comprising a second stator body and a plurality of second stator coils, the second rotor structure comprising a second rotor body and a plurality of second permanent magnets, the second rotor body being disposed inside the second stator body in a swinging manner or in a rotating manner, a swinging direction or a rotating direction of the second rotor body being different from a swinging direction or a rotating direction of the first rotor body, a plurality of second stator slots being formed on the second stator body, a plurality of second rotor slots being formed on the second rotor body, a central axis of the second stator body being coincided with a central axis of the second rotor body, the plurality of second stator slots being arranged along a circumferential direction of the second stator body, the plurality of second rotor slots being arranged along a circumferential direction of the second rotor body, the plurality of second permanent magnets being respectively disposed inside the plurality of second rotor slots, a number of the plurality of second permanent magnets being identical to a number of the plurality of second rotor slots, and the plurality of second stator coils being wrapped around the plurality of second stator slots;
a first driving component coupled to the first permanent magnet generator; and
a second driving component coupled to the second permanent magnet generator.

8. The dual-axial wave energy conversion device of claim 7, wherein the first stator structure further comprises a first shell, the first stator body is fixedly disposed inside the first shell, the second stator structure further comprises a second shell, and the second stator body is fixedly disposed inside the second shell.

9. The dual-axial wave energy conversion device of claim 8, wherein the first rotor structure further comprises a first connecting shaft coupled to the first rotor body, the first connecting shaft passes through the first shell, the second rotor structure further comprises a second connecting shaft coupled to the second rotor body, and the second connecting shaft passes through the second shell.

10. The dual-axial wave energy conversion device of claim 7, wherein each of the first stator body, the first rotor body, the second stator body and the second rotor body is formed by a plurality of silicon steel sheets.

11. The dual-axial wave energy conversion device of claim 7, wherein each of the first driving component and the second driving component is a floating component.

12. The dual-axial wave energy conversion device of claim 11, wherein the floating component comprises a first portion and a second portion, and the second portion is movable relative to the first portion to increase or reduce a total length of the floating component.

13. The dual-axial wave energy conversion device of claim 7, further comprising at least one extending and retracting assembly configured to move at least one of the first driving component and the second driving component for increasing or reducing a distance between the first driving component and the second driving component.

* * * * *